(12) United States Patent
Grodzki (10) Patent No.: US 12,546,841 B2
(45) Date of Patent: Feb. 10, 2026

(54) COMPUTER-IMPLEMENTED METHOD FOR CREATING A MAGNETIC RESONANCE SEQUENCE, MAGNETIC RESONANCE DEVICE, COMPUTER PROGRAM AND ELECTRONICALLY READABLE DATA STORAGE MEDIUM

(71) Applicant: Siemens Healthcare GmbH, Erlangen (DE)

(72) Inventor: David Grodzki, Erlangen (DE)

(73) Assignee: Siemens Healthineers AG, Forchheim (DE)

(*) Notice: Subject to any disclaimer, the term of this patent is extended or adjusted under 35 U.S.C. 154(b) by 253 days.

(21) Appl. No.: 18/234,513

(22) Filed: Aug. 16, 2023

(65) Prior Publication Data

US 2024/0069135 A1 Feb. 29, 2024

(30) Foreign Application Priority Data

Aug. 23, 2022 (DE) ...................... 10 2022 208 705.4

(51) Int. Cl.
*G01R 33/54* (2006.01)
*A61B 34/10* (2016.01)
*G01R 33/385* (2006.01)

(52) U.S. Cl.
CPC ......... *G01R 33/543* (2013.01); *G01R 33/385* (2013.01)

(58) Field of Classification Search
CPC ........ A61B 34/10; A61B 5/055; G06T 7/0012
See application file for complete search history.

(56) References Cited

U.S. PATENT DOCUMENTS

2010/0052678 A1* 3/2010 Heid ...................... G01R 33/54
324/309
2011/0254545 A1* 10/2011 Gebhardt ........... G01R 33/5612
324/307

(Continued)

FOREIGN PATENT DOCUMENTS

DE 102016200549 A1 7/2017

*Primary Examiner* — Huy Q Phan
*Assistant Examiner* — Temilade S Rhodes-Vivour
(74) *Attorney, Agent, or Firm* — Lempia Summerfield Katz LLC (57) ABSTRACT

Systems and methods for creating a magnetic resonance sequence for a magnetic resonance device. The magnetic resonance sequence is described by at least one sequence parameter and provided parameter values of the sequence parameters are used for the determination of a temporal sequence pattern over time by simulation of a subsection of the magnetic resonance sequence by a simulation unit. A permissible parameter value range for at least one selected one of the sequence parameters is determined by an evaluation unit on the basis of the temporal sequence pattern and provided limitations. A new parameter value of the at least one selected parameter within the permissible parameter value range is defined by a definition unit. At least one duration limitation relating to the entire duration of the magnetic resonance sequence, or a specified time constant is provided. The temporal sequence pattern is expanded beyond the subsection by the simulation unit by repetition of the subsection, until the entire duration or the specified time constant is reached or an abort criterion relating to the duration limitation is satisfied.

18 Claims, 3 Drawing Sheets

(56) References Cited

U.S. PATENT DOCUMENTS

| | | | |
|---|---|---|---|
| 2014/0073908 A1* | 3/2014 | Biber | G01R 33/56308 |
| | | | 324/322 |
| 2016/0139227 A1* | 5/2016 | Grodzki | A61B 5/055 |
| | | | 324/309 |
| 2017/0205483 A1* | 7/2017 | Feiweier | G01R 33/288 |
| 2019/0041478 A1* | 2/2019 | Grodzki | A61B 5/055 |

\* cited by examiner

COMPUTER-IMPLEMENTED METHOD FOR CREATING A MAGNETIC RESONANCE SEQUENCE, MAGNETIC RESONANCE DEVICE, COMPUTER PROGRAM AND ELECTRONICALLY READABLE DATA STORAGE MEDIUM

CROSS REFERENCE TO RELATED APPLICATIONS

This application claims the benefit of DE 10 2022 208 705.4 filed on Aug. 23, 2022, which is hereby incorporated by reference in its entirety.

FIELD

Embodiments relate to a computer-implemented method for creating a magnetic resonance sequence for a magnetic resonance device, a magnetic resonance device, a computer program, and an electronically readable data storage medium.

Better image qualities, faster acquisition times and other improvements in magnetic resonance imaging increasingly call for a higher performance and load factor of the components of the magnetic resonance device. Methods have been proposed to exploit the performances of individual components, for example the gradient system, beyond conservatively measured limits.

DE 10 2016 200 549 A1 proposes a method for creating a magnetic resonance sequence, wherein at least one limitation is provided by a limitation provision unit and multiple sequence parameters of the magnetic resonance sequence are provided by a parameter provision unit. At least one of the multiple sequence parameters is assigned a default parameter value. After one of the multiple sequence parameters has been selected by a selection unit, a simulation unit determines at least one temporal sequence pattern on the basis of at least one of the default parameter values. An evaluation unit determines a permissible parameter value range of the selected parameter on the basis of the at least one temporal sequence pattern and on the basis of the at least one limitation, so that a new parameter value may be defined within the permissible parameter value range by a definition unit. In this case the magnetic resonance sequence is rolled out over time to determine the at least one temporal sequence pattern, wherein corresponding simulations may take place. Since rolling out magnetic resonance sequences in the simulation unit takes a great deal of time, for example times comparable to the execution of the magnetic resonance sequence itself are required for the entire magnetic resonance sequence, it was here specifically proposed to ascertain the temporal sequence pattern only for a subsection of the magnetic resonance sequence, that is to be representative of the entire magnetic resonance sequence, so that from an examination of this subsection it is possible to infer the permissible parameter value range of the selected parameter for the entire sequence, for example by extrapolation. In this case for example the parts of the magnetic resonance sequence that place particular performance requirements on components of the magnetic resonance device may be selected as a subsection.

Using the method described in DE 10 2016 200 549 A1 it is consequently possible for example to achieve a significantly higher utilization of the gradient system, and higher gradient strengths may be made available in magnetic resonance sequences. The normal limitations of magnetic resonance sequences, that reduce the maximum gradient values available to the sequence to approx. 50-70% of the maximum gradient strengths possible in the system, may be dispensed with. The original purpose of such conservative limitations was to prevent possible overshoots of other system parameters, such as the maximum heating, that is dependent on the average gradient power, or the overshoot of maximum gradient strengths or maximum slew rates in the case of angulated acquisitions, in which parts of different logical axes may coincide on a physical axis. Hence in DE 10 2016 200 549 A1 it is proposed to find parameter value ranges in an optimizing manner for which the limitations are overall lifted, appropriate additional calculations being necessary for this.

The additional calculations in the simulation unit are also called "checks" and simulate a subsection of the imaging protocol of the magnetic resonance sequence, created for example by a user, wherein for gradient systems for example the patterns of the gradients may be rolled out and may be checked. If during a check it is established that a limitation has been violated, a proposed solution for the execution of the magnetic resonance sequence may be determined (solving).

The procedure described has hitherto mainly been used to "extract" more performance in magnetic resonance devices with low main magnetic field strengths, consequently, to achieve there a better utilization of the components of the magnetic resonance device, for example of the gradient system. Should the procedure be applied to higher-powered magnetic resonance devices and/or those with different features, other requirements on the checks mentioned occur, for example in significantly more powerful gradient systems, in which limitations of the gradient system and of other components are violated at other points. Whereas with less powerful gradient systems, for example, limitations in respect of the maximum gradient strength and/or the maximum slew rate are mainly relevant, it has been shown that for magnetic resonance devices with more powerful gradient systems limitations relating to continuous performance, for example limits for the average gradient power, gain in relevance. For this, it is not sufficient to take account where appropriate of subsections of the magnetic resonance sequence in order to prevent overloads of the magnetic resonance device, for example overheating, while on the other hand rolling out the entire magnetic resonance sequence in full in the simulation unit takes too long.

BRIEF DESCRIPTION AND SUMMARY

The scope of the present invention is defined solely by the appended claims and is not affected to any degree by the statements within this summary. The present embodiments may obviate one or more of the drawbacks or limitations in the related art.

Embodiments provide improved protection of components of magnetic resonance devices, for example in regards continuous loads, at the same time as a high load factor.

A method includes where at least one duration limitation relating to the entire duration of the magnetic resonance sequence or a specified time constant is provided, and the temporal sequence pattern is expanded beyond the subsection by the simulation unit by repetition of the subsection, until the entire duration or the specified time constant is reached or an abort criterion relating to the duration limitation is satisfied.

Embodiments repeat the subsection of the magnetic resonance sequence in the simulation until a sufficiently accurate prediction is also possible in respect of the duration limitations relating to longer time intervals. For example, the subsequence may relate to a part of the magnetic resonance sequence that is significantly shorter than a second, for example shorter than 10 ms. To permit a more accurate evaluation of duration limitations, sequence patterns may however be evaluated over longer periods, for example described by the specified time constant, for example for a time constant of at least 10 ms, for example at least one second, for example at least ten seconds. While it might now be possible, in the manner of the rule of three, to extrapolate the subsection or the result thereof that is relevant to the duration limitation, this procedure is not however sufficiently expedient and reliable, since for example possible transient responses and other effects cannot be taken into account. Consequently, the embodiments provide during the simulation, for example therefore the rollout, to repeat the subsection of the magnetic resonance sequence artificially, that means that the subsection is always appended again at least for the evaluation of the duration limitation and the data is further simulated, so that a temporal sequence pattern that is expanded compared to the subsection and builds on the previous one is produced. In this case the simulation is aborted at the latest when the entire duration of the magnetic resonance sequence is reached, but potentially earlier, for example when the specified time constant is reached or else when one of at least one abort criterion is satisfied. The abort criterion may indicate that the desired information in respect of the duration limitation has been received. Repeating the subsection provides many opportunities for saving computation time, despite the longer determined temporal sequence pattern, and thus for not excessively prolonging the determination of the permissible parameter value range, this being examined in greater detail below.

By repeating the subsection, the operands relevant to checking the duration limitation are where appropriate slightly, but not significantly, overestimated, since the subsection is normally selected after the presence of peak loads, so that the peak loads outside the subsection may be considered to be lower in most cases. This may be taken into account where appropriate when checking the violation of the duration limitation, but it has been shown that this aspect has a rather minor impact and even without this correction there is in any case a significant improvement compared to a simple extrapolation.

Embodiments provide an opportunity of taking account of duration limitations of high quality and accuracy, even though not the entire magnetic resonance sequence is simulated, but only a subsection that may be too short for accurate calculations. Hence the subsection is repeated for long enough in the simulation until a reliable, accurate estimation of compliance with or violation of the duration limitation from the temporal sequence pattern expanded in this way is possible. In this way the dependability and operational reliability of magnetic resonance devices is increased despite greater use being made of the performance thereof, for example in respect of the gradient system. For example, it is also possible for the procedure described in DE 10 2016 200 549 A1 now also to be employed for high-performance magnetic resonance devices, where the duration limitations play a larger role. Measurement settings that are advantageous there may consequently also be determined and the image quality increased and/or the entire duration of the magnetic resonance sequence reduced. Since the embodiments advantageously develops the method of DE 10 2016 200 549 A1, the entire disclosure is herein incorporated by reference in its entirety.

The permissible parameter value range may for example be continuous or interrupted, i.e., may include multiple non-continuous intervals. The definition of the new parameter value within the permissible parameter value range may take place automatically and/or by an operator. When it is defined by an operator, the operator may set a possible parameter value for the selected sequence parameter. To this end, the operator may be shown the permissible parameter value range using an output unit, for example a monitor. This display may for example be color-coded and/or graphically coded, to make it easier for the operator to define the new parameter value. On the basis of the new parameter value a magnetic resonance acquisition may be performed by the magnetic resonance device.

A limitation, thus also a duration limitation, may be understood as a condition, the satisfaction of that is advantageous, for example necessary and/or indispensable, for operation. The at least one limitation may include at least one device limitation and/or at least one application limitation.

A device limitation may for example be understood as a restriction imposed by a configuration of the magnetic resonance device with which the magnetic resonance imaging is to be performed. By way of example of a limitation relating to a current state, mention may be made of a maximum gradient amplitude (gradient strength/gradient power) and/or a maximum gradient slew rate, that may be generated by a gradient coil arrangement of the magnetic resonance device. A gradient slew rate may normally be understood as the absolute amount of the deviation over time of the gradient amplitude, i.e., it may be understood primarily as a sign-independent change rate of the gradient amplitude. A duration limitation may for example take the form of a barrier for the mean quadratic gradient amplitude.

An application limitation may for example be understood as a restriction caused by an influence on the magnetic resonance device and/or on an object under examination, for example a human or animal patient, due to a performance of a magnetic resonance sequence. Thus, it is for example possible for overheating of the magnetic resonance device or part of the magnetic resonance device to be caused by an application of excessive gradient strengths. Limits may be physiological as well as technical. For example, the patient's peripheral nerves may be overstimulated by incorrect operation of the magnetic resonance device.

The at least one limitation may include at least one, for example adjustable, safety buffer. For example, the limit value provided as a limitation is not a physical limit value and/or a limit value that is physiologically just possible, but a value that deviates in a conservative manner from a maximum possible limit value. Thus, the operational safety of the magnetic resonance device may be increased.

The at least one limitation may be stored in a database that the limitation provision unit accesses. The limitation provision unit transmits the at least one limitation at least to the evaluation unit, for example also to the simulation unit.

The multiple sequence parameters are suitable for describing and/or defining the magnetic resonance sequence. Examples of sequence parameters are a repetition time (TR) and/or an echo time (TE) and/or a flip angle and/or a readout bandwidth and/or a slice orientation and/or a field of view (FoV).

The multiple parameters and/or the default parameter values assigned to the parameters may be stored in a database that a parameter provision unit providing the sequence parameters accesses. The parameter provision unit transmits the multiple parameters and/or the parameter values to the output unit, to display these and/or parameters and/or parameter values derived therefrom to the operator at least in part.

The selection may be performed by an operator and/or automatically. When the selection is performed by an operator, the selection unit includes an input unit, that for example includes a monitor. The selection by an operator for example includes the operator selecting an input field on the monitor, that is assigned to the desired parameter. This input field may for example already have a default parameter value that may subsequently be changed for example by manually inputting a new parameter value. An automatic selection may for example be configured such that the magnetic resonance sequence is optimized, for example in respect of a period of time, without an operator having to intervene manually.

A temporal sequence pattern normally maps a sequence over time of events, such as for example excitation pulses and/or gradient pulses and/or readout procedures. The determination of the at least one temporal sequence pattern may include a rollout over time of the subsection of the magnetic resonance sequence. The determination of the at least one temporal sequence pattern takes place for example on the basis of one or more parameter values that are not assigned to the selected sequence parameter.

The determination of a temporal sequence pattern may include a calculation of a value table, wherein the value table includes a first column and a second column, wherein the first column includes at least one time value, and the second column includes at least one pattern value assigned to the at least one-time value. In this case a time value normally corresponds to a point in time of the temporal sequence pattern, so that the number of rows in the value table results from the number of points in time of the temporal sequence pattern. The pattern values are normally dependent on at least one of the parameter values.

Possible pattern values may for example be gradient amplitudes that may be applied on the physical gradient axes of the gradient coil arrangement. A temporal sequence pattern including gradient amplitudes may take account of correction gradients and/or compensation gradients, for example eddy current compensation gradients, so that the temporal sequence pattern maps the actual use of the gradient coil arrangement. Thus, the method works more accurately than with a hypothetic consideration in abstracted form.

The gradient coil arrangement may include gradient coils for three physical gradient axes, that may be referred to as the x, y and z axis. In a magnetic resonance device with a cylindrical patient receiving facility the z axis often corresponds to the cylindrical axis of the patient receiving facility. A vertical axis at right angles to the z axis is often defined as the y axis and a horizontal axis at right angles to the y axis and z axis is often defined as the x axis.

Only a limited gradient amplitude, for example a maximum gradient amplitude, may normally be applied to each of the three physical gradient axes, and may normally be changed with a limited gradient slew rate, namely the maximum gradient slew rate.

Logical gradient axes may be differentiated from the physical gradient axes. The logical gradient axes normally include a slice selection gradient axis, a phase encoding gradient axis and a frequency encoding gradient axis, that generally form a three-dimensional right-angled coordinate system. The position of the logical gradient axes relative to the physical gradient axes normally defines the orientation of the scan range, for example of a slice to be scanned.

A slice selection gradient is normally applied in parallel to the slice selection gradient axis. With the aid of slice selection gradient pulses, often also called slice selection gradients for short, nuclei in a desired slice may be selectively excited. Furthermore, phase encoding gradient pulses, often also called phase encoding gradients for short, are normally applied in parallel to the phase encoding gradient axis, and frequency encoding gradient pulses, often also called frequency encoding gradients for short, are normally applied in parallel to the frequency encoding gradient axis. Phase encoding gradient and frequency encoding gradient generally provide position encoding of the magnetic resonance signals in the excited slice. The frequency encoding gradient may also be referred to as a readout gradient, since it is normally applied at the same time as the readout of the magnetic resonance signals.

In many cases, depending on orientation and/or tilt of the scan range and/or of the measured slice, the logical gradient axes therefore deviate from the physical gradient axes, so that the gradient pulses of the logical gradient axes, depending on the orientation and/or tilt of the scan range and/or of the measured slice, spread onto the physical gradient axes.

The at least one temporal sequence pattern may include multiple points in time. To establish whether a particular parameter value of the selected sequence parameter is permissible, in other words is within the permissible parameter value range, each of the points in time is examined as regards the at least one limitation. In contrast, it is generally sufficient to find just one point in time at which the at least one limitation is not satisfied, in order to establish that the parameter value of the temporal sequence pattern is not permissible, so that the examination of the temporal sequence pattern may be aborted, that thanks to the abort criteria is also provided during the expansion.

To determine the permissible parameter value range of the selected parameter, various test parameter values may be determined for the parameter value of the selected parameter, i.e., the parameter value of the selected parameter may be varied. For each of the test parameter values at least one temporal sequence pattern is determined, that is checked by the evaluation unit as regards the at least one limitation. By varying a parameter value, for example the parameter value of the selected sequence parameter, various test temporal sequence patterns may therefore be determined. For example, a first test temporal sequence pattern may be determined for a first parameter value, a second test temporal sequence pattern for a second parameter value, etc. Depending on where violations of the at least one limitation are present, the permissible parameter value range may be determined. For details in this respect, reference is also made to the cited DE 10 2016 200 549 A1.

In this case the at least one duration limitation is expediently not the only limitation that is provided by a corresponding limitation provision unit. For example, at least one limitation may be provided that is related to a current state, for example a limitation with higher priority. It may then be provided that at least one limitation that is related to a current state, for example a limitation with higher priority, is evaluated on the basis of a single pass, for example the first pass of the simulation of the subsection. If for example a violation of the corresponding limitation, related to a current state, is present, if for example a threshold value for a current value is exceeded, it may sometimes no longer be necessary still to expand the temporal sequence pattern for this parameter value, since it is already impermissible. This saves computing time and computing effort. Examples include the aforementioned maximum gradient amplitude per physical gradient axis and/or the maximum gradient slew rate per physical gradient axis.

It is advantageous if during the repetition of the simulation passes of the subsection at least one interim result of a previous simulation pass, for example of the first simulation pass, is reused. Because the same subsection is repeated for the expansion of the temporal sequence pattern in the simulation, many calculations, for example a majority of the calculations, have already been performed and may also be reused for further simulation passes of the subsection, so that computation effort and thus also computation time may be saved, for example to a large extent. In this respect a repetition of the subsection already proves to be advantageous compared to rolling out larger parts of the magnetic resonance sequence, for example the entire magnetic resonance sequence.

In embodiments it may further be provided that the repetition of the simulation of the subsection is restricted to a component or group of components particularly relevant in respect of the duration limitation, for example to a gradient system of the magnetic resonance device. Consequently, components of the magnetic resonance device, that as regards the duration limitation have only a limited influence, may be omitted from the repetitions to save computing effort and computing time, wherein for example where appropriate interim results of the first simulation pass, as already mentioned, may be accessed if at least one particular consideration is to take place. If for example the duration limitation mainly relates to the gradient system, for example to a permissible average performance, it may be provided that the simulation of the repetition of the subsection is restricted to the gradient system, but for example the receiving system, the transmission system and the like are not included.

As an abort criterion a check may be made to see whether a calculation value that may be derived from the temporal sequence pattern exceeds or undershoots a threshold value defined by the duration limitation. This means that the abort criterion may, broadly speaking, monitor whether the duration limitation is violated. Since the repetition of the subsection is (mainly) used to check the duration limitation, it is also possible, if this is violated, to dispense with further compute-intensive and time-consuming simulation, as the information mainly desired has been obtained. For example, in the case of duration limitations relating to a gradient system, such a calculation value may be the mean, where appropriate quadratic, gradient amplitude, for example broken down by physical gradient axes. The corresponding threshold value may then for example be selected such that it describes a continuous load capacity of the gradient system, for example in relation to the corresponding physical axis. In this case more complex threshold value comparisons, for example threshold value comparisons using multiple threshold values, may be used to check the violation of a duration limitation and thus may be used as an abort criterion. For example, rules are known that permit a spread of the performance to physical gradient axes, for example what is known as the 90/70/30 rule, that on a physical gradient axis permits 90% of a corresponding maximum duration, on a further one 70% and on the third 30%. The mention of the gradient amplitude, for example of the gradient strength or gradient power, is of course to be understood here only by way of example and other variables may also be taken into account as regards the continuous load, for example slew rates, temperatures and also account values from account models already known from the prior art.

In this connection an embodiment provides that as a further abort criterion a check is made to see whether a pattern of the calculation value indicates an expected failure to achieve the threshold value over the entire duration or the specified time constant, for example an asymptotic pattern. From the pattern of the calculation value, for example if a type of saturation or another asymptotic pattern occurs, it is already also possible to estimate early on during the expansion of the temporal sequence pattern whether a violation of the duration limitation, here whether at least one of the at least one threshold value exceeds the corresponding calculation value, is even possible or whether there is a risk of this. If for example a maximum is exceeded, then if an asymptotic or even an extremely slowly increasing pattern of the calculation value with significantly lower values than the maximum may be derived from the temporal sequence pattern, it may already be inferred early on that the maximum, in other words the threshold value, will no longer be reached and thus the simulation may be aborted, saving computing effort and time.

The duration limitation may, for example as a calculation value, relate to an average value and/or an account value, for example in respect of a cooling device of the magnetic resonance device and/or in respect of energy to be consumed by a gradient system of the magnetic resonance device. Examples of average values have already been touched upon with the mean, for example quadratic, gradient amplitude, for example broken down by physical gradient axes, but may also relate to other calculation variables, for example slew rates, temperatures and the like. In respect of the gradient amplitude, that may also be a gradient strength, the term "nominal gradient strength" is also used. In connection with the embodiments however, account models, for example for the cooling device and/or the gradient system, may also be used, as have already been variously proposed in the prior art.

For the evaluation of the temporal sequence pattern a correction that takes account of the selection of the subsection may be applied. In this respect it has already been mentioned that for a corresponding selection of a subsection relating to maximum powers or peak requirements an overestimation of operands or the calculation values thereof may take place, that may accordingly be taken into account with a correction such as this. For example, for a subsection containing the maximum requirements at least one mean value and/or consumption value may be reduced (as a calculation value). Thus, greater accuracy may be achieved.

For example, a section of the magnetic resonance sequence, in which outer k-space points may be encoded, may be used as the subsection. Mostly high current requirements are laid down here, for example as regards the gradient system. For example, such outer k-space points are located at least 70%, at least 80%, or at least 90%, away from the center of the k-space in relation to the entire k-space.

Embodiments provide a magnetic resonance device with a control device, that includes: a limitation provision unit for the provision of at least one limitation, wherein the at least one limitation includes at least one duration limitation relating to the entire duration of the magnetic resonance sequence or a specified time constant, a sequence parameter provision unit for the provision of multiple sequence parameters of a magnetic resonance sequence, a selection unit for the selection of at least one of the multiple sequence parameters, a simulation unit for the determination of a temporal sequence pattern over time by simulation of a subsection of the magnetic resonance sequence on the basis of the at least one selected sequence parameter and for the expansion of the temporal sequence pattern beyond the subsection by repetition of the subsection, until the entire duration or the specified time constant is reached or an abort criterion relating to the duration limitation is satisfied, an evaluation unit for the determination of a permissible parameter value range for at least one selected one of the sequence parameters on the basis of the temporal sequence pattern and the at least one limitation, a definition unit for the definition of a parameter value of the at least one selected sequence parameter within the permissible parameter value range, and a sequence unit for the acquisition of magnetic resonance data by the magnetic resonance sequence with the defined parameter value.

The control device is configured for the performance of the method. All explanations in respect of the method may be transferred analogously to the magnetic resonance device, with which consequently likewise the aforementioned advantages may be obtained.

The control device may in this case include at least one processor and at least one storage device, via which the cited functional units may be provided, but that may also be implemented at least in part by hardware. In this case the sequence unit, as known in principle, is used for the general control of the acquisition operation of the magnetic resonance device.

A computer program may be loaded directly into a storage a computing device, for example a control device of a magnetic resonance device, and includes program code in order to perform the steps of the method when the computer program is executed on the computing unit. The computer program may be stored on an electronically readable data storage medium, that includes control information stored thereon that includes at least one computer program and when the data storage medium is used in a computing device, for example a control device of a magnetic resonance device, trains the latter to perform the method.

DETAILED DESCRIPTION

Figure 1:
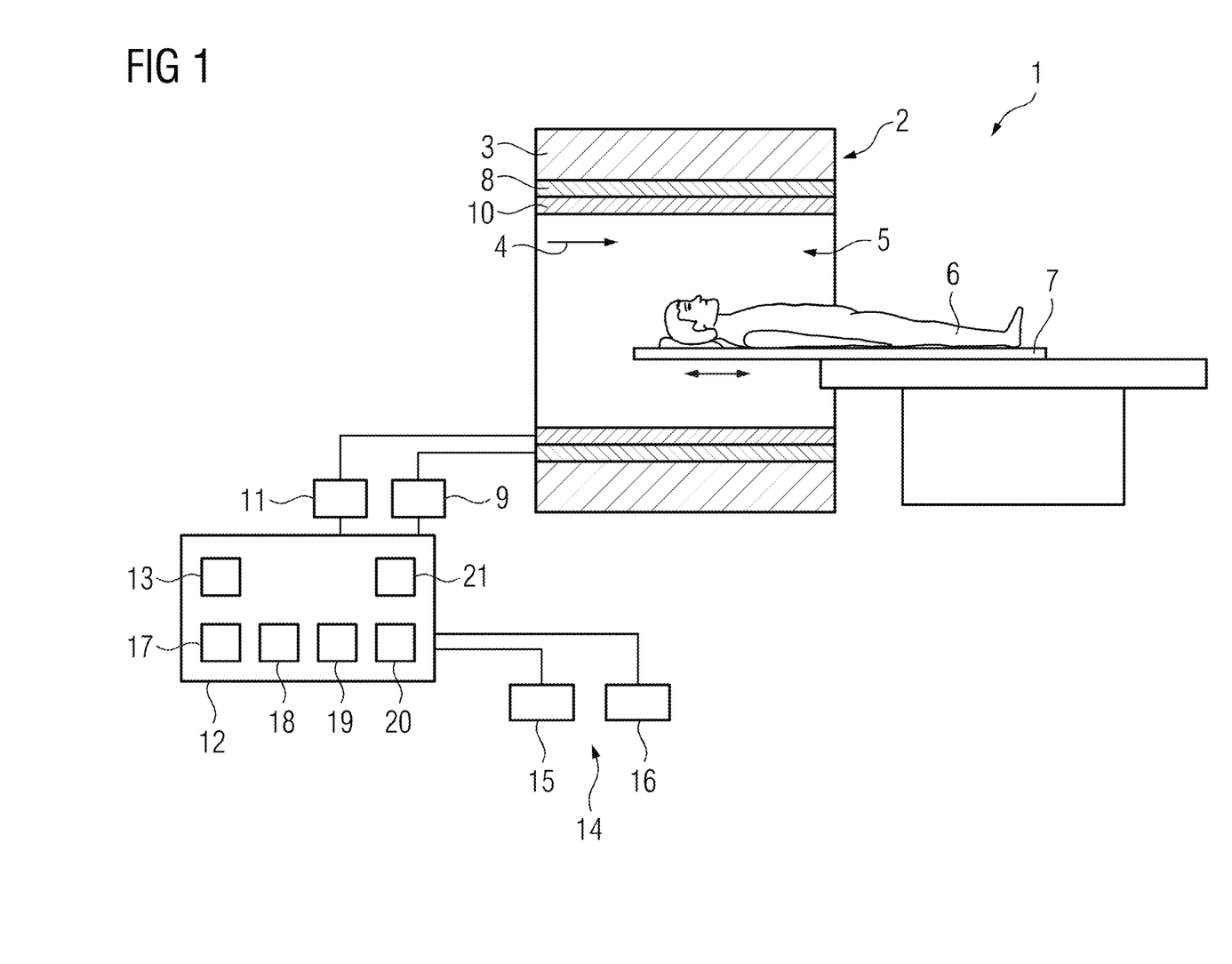
FIG. 1 depicts a schematic outline of a magnetic resonance device according to an embodiment.

FIG. 1 depicts a schematic outline of a magnetic resonance device 1. The magnetic resonance device 1 includes, as is known in principle, a main magnet unit 2, that includes a superconducting main magnet 3 for the generation of a main magnet field 4 that is strong and for example constant over time. The main magnet unit 2 defines a cylindrical patient receiving facility 5, into which a patient 6 may be introduced by a patient couch 7 for a magnetic resonance examination.

Surrounding the patient receiving facility 5, the magnetic resonance device 1 includes a gradient coil arrangement 8 as part of a gradient system, that may be used for spatial encoding during the imaging and for example may have three gradient coils for three physical gradient axes. The gradient system further includes a gradient amplifier 9. Following inwardly to the patient receiving facility 5 is also a radio-frequency coil arrangement 10, for example a body coil. Thanks to the radio-frequency coil arrangement 10, radio-frequency pulses of a magnetic resonance sequence may be generated, for example, in order to excite nuclear spins oriented in the main magnet field 4. A radio-frequency antenna control unit 11 is provided to actuate the radio-frequency coil arrangement 10. By the radio-frequency coil system, that may also include further transmission and/or receiving coils, both the described transmission of radio-frequency pulses and reception of magnetic resonance signals is possible.

The operation of the magnetic resonance device 1 is controlled by a control device 12. The control device 12 initially includes a sequence unit 13 in order to actuate the components of the magnetic resonance device 1 for the output of a magnetic resonance sequence, for example a gradient echo sequence and/or a spin echo sequence, so that magnetic resonance signals may be acquired. The control device 12 in this connection includes a reconstruction unit (not shown in greater detail) for the reconstruction of medical magnetic resonance data, for example magnetic resonance image datasets.

A user interface 14 enables users to interact with the magnetic resonance device 1, for example the control device 12, for which purpose this includes a display unit 15, for example a monitor, and an input unit 16, via which for example sequence parameters of magnetic resonance sequences and further information may be input.

The control device 12 is configured for the performance of the method. To this end it includes a limitation provision unit 17 that is configured to provide at least one limitation. The at least one limitation includes at least one duration limitation relating to the entire duration of a magnetic resonance sequence or a specified time constant. A sequence parameter provision unit 18 may provide multiple sequence parameters of the magnetic resonance sequence. By the input unit 16, that in this embodiment is included by a selection unit (not shown in greater detail here), one of the multiple sequence parameters may be selected. An automatic selection using the selection unit is also possible.

The control device 12 further includes a simulation unit 19, that is configured to determine at least one temporal sequence pattern on the basis of the at least one selected parameter. The temporal sequence pattern is determined by the simulation unit 19 initially for a subsection of the magnetic resonance sequence, that does not include the entire magnetic resonance sequence, for example covers a period that is shorter than 1 s, for example shorter than 10 ms, and relates to particularly high performance requirements. Specifically the subsection relates to part of the magnetic resonance sequence, by which outer k-space points are encoded. The simulation unit 19 is further configured to expand over time the temporal sequence pattern resulting after a first simulation of the subsection, in that the subsection is repeated until either the entire duration of the magnetic resonance sequence or the specified time constant are reached or an abort criterion relating to the duration limitation is satisfied.

An evaluation unit 20 is configured to determine, on the basis of the at least one temporal sequence pattern over time and the at least one limitation, a permissible parameter value range of the at least one selected sequence parameter. A definition unit for the definition of a parameter value within the permissible parameter value range is likewise not shown in greater detail and may in turn include the input unit 16. An automatic definition may be performed.

After defining all parameter values of the magnetic resonance sequence this magnetic resonance sequence may be used to acquire magnetic resonance signals by the sequence unit 13.

To store the various data and information the control device 12 further also includes storage 21. Besides the components shown, the magnetic resonance device 1 may of course also have further components, a more detailed explanation of the functionality being dispensed with.

Figure 2:
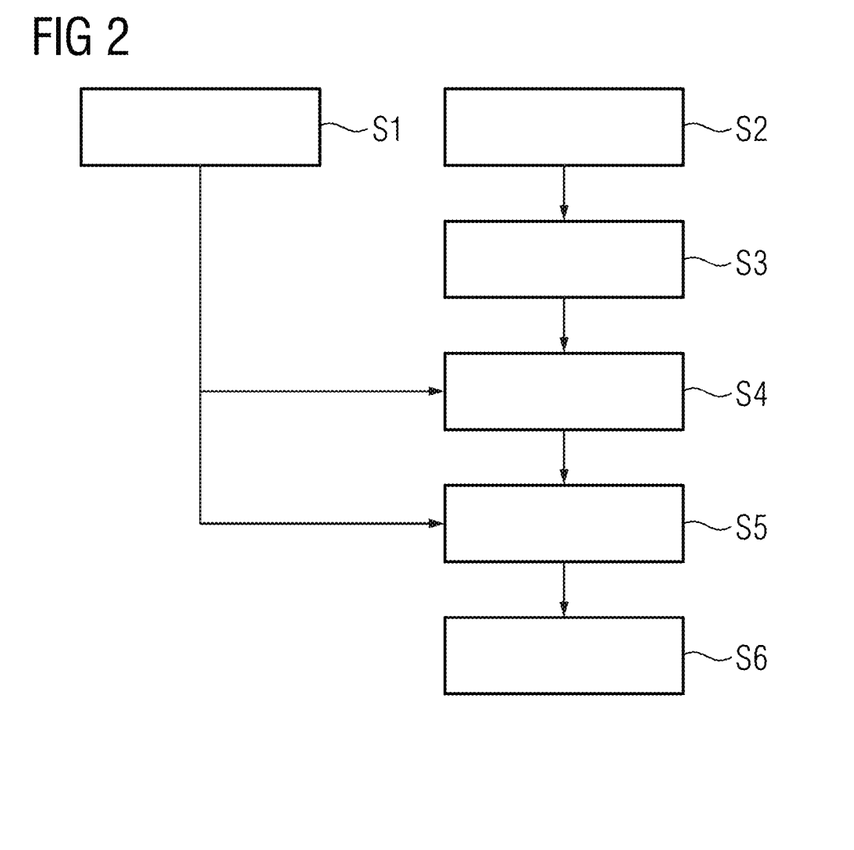
FIG. 2 depicts a flow chart of an embodiment of the method.

An embodiment of the method is explained by the flow chart in FIG. 2.

In a step S1, limitations are provided by the limitation provision unit 17. The limitations in the present case include at least one duration limitation, as already explained, but also at least one limitation relating to a current state. Limitations relating to a current state may for example include maximum permitted gradient amplitudes (gradient strengths/gradient powers) and/or maximum permitted slew rates, whereas duration limitations for example may target the exhaustion of an account in an account model and/or threshold values for mean values. One example is the nominal, where appropriate quadratic, gradient power, that may not be exceeded by the, for example quadratic, mean value, for example per physical gradient axis or in a particular distribution over the gradient axes.

In a step S2 multiple parameters of a magnetic resonance sequence are provided by the parameter provision unit 18, wherein each of the sequence parameters is assigned a default parameter value, that for example may be specified by the user or automatically.

In a step S3 at least one parameter is selected from the multiple sequence parameters. This may be done for example by an operator by the input unit 16, but also at least in part automatically. The operator may in this case be offered sequence parameters on the display unit 15 for selection.

In a step S4 a temporal sequence pattern for the magnetic resonance sequence is then determined by the simulation unit 19, initially for the subsection of the magnetic resonance sequence. This is, as already mentioned, defined as a short part of the magnetic resonance sequence, for example shorter than 1 s, for example shorter than 10 ms, in which peak requirements exist, as is the case for the gradient system for example when measuring the outer areas of the k-space. In this case a rollout over time of the subsection of the magnetic resonance sequence may be performed for the simulation. The subsection of the magnetic resonance sequence may be split into multiple points in time, for each of which a pattern value may be calculated. In this case gradient patterns are rolled out. The presentation may be made such that it may actually be executed by the hardware of the magnetic resonance device 1. Eddy current compensations and the like are taken into account. The temporal sequence pattern is determined at least for the default parameter values, wherein determinations for test parameter values are also possible.

In embodiments a check may already initially be made as regards the limitations relating to a current state after determination of the temporal sequence pattern over time for the subsection, since then, if one of these limitations is violated, a more extensive determination of the temporal sequence pattern may be unnecessary. However, in cases in which the limitations relating to a current state are not violated on the basis of the first simulation pass of the subsection, an extension over time of the temporal sequence pattern takes place on the part of the simulation unit 19, in which the subsection is repeated, in other words is further simulated consecutively, until a specified time constant, that for example may be at least one second, for example at least ten seconds, for the assessment of the at least one duration limitation or the entire duration of the magnetic resonance sequence is reached.

Figure 3:
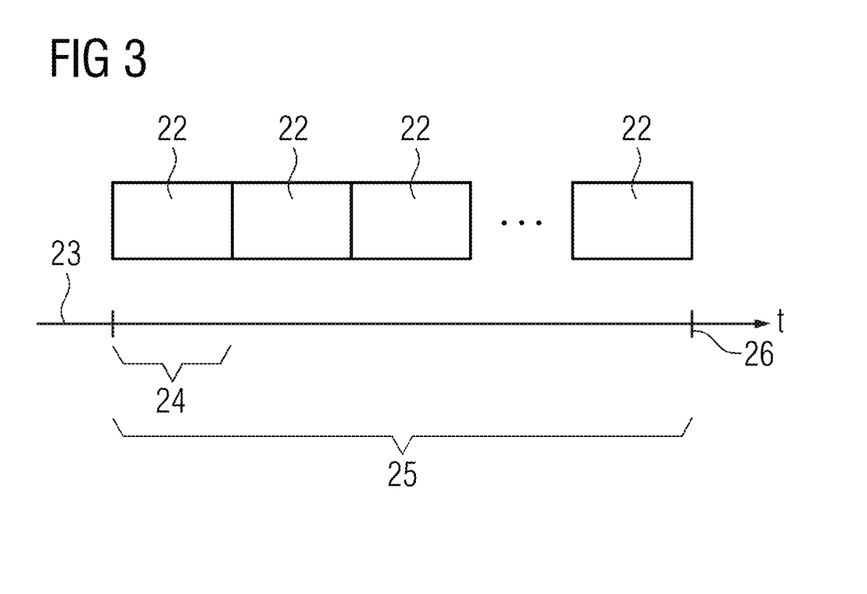
FIG. 3 depicts an outline of the expansion of a temporal sequence pattern according to an embodiment.

This is explained in greater detail by the schematic outline in FIG. 3. Each box 22 stands for a simulation of the subsection of the magnetic resonance sequence. The first simulation of the subsection in this case covers only a short period 24 on the timeline 23, for example of less than one second, for example a maximum of 10 ms. Longer consideration is however necessary in order to assess a violation of the duration limitation, that is why thanks to the repetition of the subsequence, cf. further boxes 22, an extension of the temporal sequence pattern over time obtained as the result is possible, for example, until the temporal sequence pattern over time covers a time interval the length of the specified time constant 25, so that an abort takes place at a point in time 26.

Figure 4:
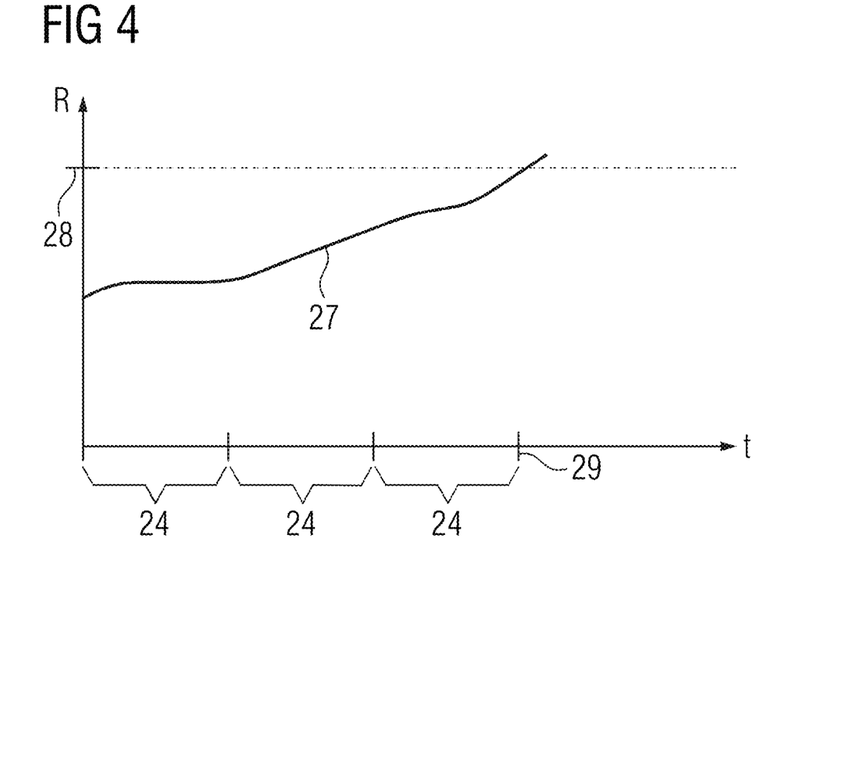
FIG. 4 depicts a first pattern of a calculation value according to an embodiment.

However, on the basis of the abort criteria it is also possible to abort earlier if an abort criterion is satisfied. A simple abort criterion may be that a calculation value, that for a violation of a duration limitation must exceed a threshold value, also exceeds this threshold value, so that a violation of the duration limitation already exists before the specified time constant 25 or the entire duration of the magnetic resonance sequence is reached. To this end FIG. 4 depicts a pattern 27 by way of example of a calculation value R over multiple of the periods 24 covered by the subsection. Furthermore, the threshold value 28 is displayed. After three periods 24, at a point in time 29 the calculation value already exceeds the threshold value 28, so that the duration limitation is violated. The expansion of the temporal sequence pattern is then aborted. The calculation value may for example be the value of the mean gradient amplitude or the square thereof, since a comparison is made with a nominal gradient strength, for example for a particular physical gradient axis.

Figure 5:
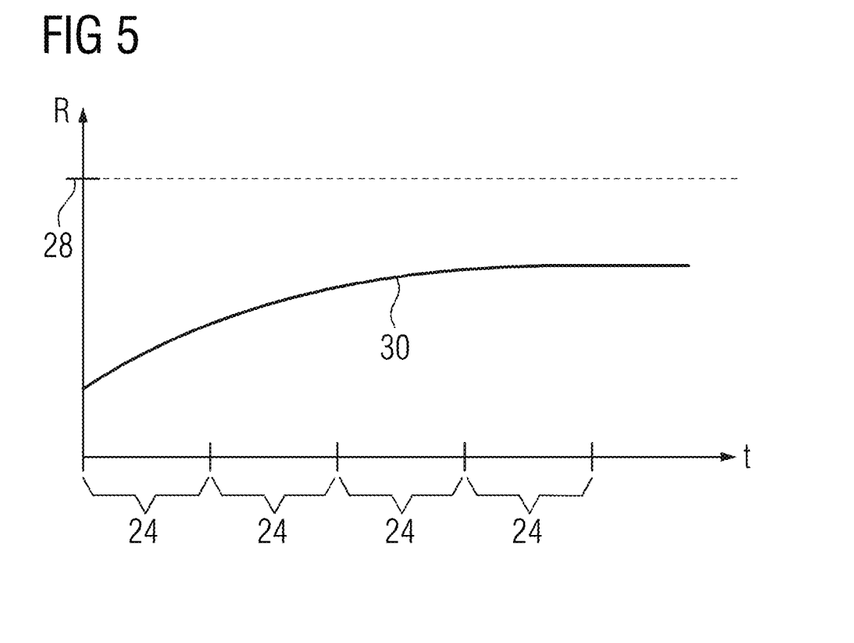
FIG. 5 depicts a second pattern of a calculation value according to an embodiment.

FIG. 5 depicts a further pattern 30 of a calculation value R compared to the threshold value 28. As may be seen, the pattern 30 is an asymptotic pattern that changes only slightly after several periods 24, so that already at this point in time it is possible to estimate that the threshold value 28 will never be reached. This may be defined using a correspondingly formulated abort criterion and the simulation, specifically the expansion, may be correspondingly terminated.

Besides these abort criteria, the fact that always the same subsection is repeated may also otherwise be used to reduce the computing effort and the computation time. In this case interim results of previous simulation passes are reused where possible, that already brings significant advantages. Furthermore, only significant parts are simulated at the same time during repetitions in the simulation pass, for example radio-frequency activities and the like are ignored during analyses relating mainly to the gradient system. A restriction to a relevant component or group of components therefore takes place.

Returning to FIG. 2, in a step S5 a permissible parameter value range of the at least one selected sequence parameter is determined by the evaluation unit 20 on the basis of the at least one temporal sequence pattern and the limitations. Here, as also described in DE 10 2016 200 549 A1, contiguous searches and/or binary searches and/or optimization approaches may be used to which end reference is made to the corresponding description there.

However, in this case it may be noted that steps S4 and S5 are in the present case also at least partially interleaved, if, for example in order to save computing effort and/or computing time during the expansion of the temporal sequence pattern, the compliance with limitations is checked at an early stage and/or it becomes necessary to determine further sequence patterns for the evaluation.

Then in a step S6 a new parameter value of the selected sequence parameter may be defined, for example by an operator, that is situated within the permissible parameter value range that was determined in step S5.

In this case it may also be noted at this point that for example in respect of mean values and/or consumption values, for example account values, as calculation values, a correction may also be used to take account of the fact that by virtue of the subsection being selected as covering the peak requirements an overestimation in respect of the calculation values may take place. Hence for example a reduction, for example of mean quadratic gradient powers/gradient strengths and the like, may take place.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for creating a magnetic resonance sequence for a magnetic resonance device, the method comprising:
   determining, by a control device of the magnetic resonance device, a temporal sequence pattern over time using provided parameter values of sequence parameters and a simulation of a subsection of the magnetic resonance sequence by a simulation unit, wherein the magnetic resonance sequence is described by at least one sequence parameter of the sequence parameters;
   determining, by an evaluation unit of the control device, based on the temporal sequence pattern and provided limitations, a permissible parameter value range for at least one selected sequence parameter of the sequence parameters; and
   defining, by a definition unit of the control device, a new parameter value of the at least one selected parameter within the permissible parameter value range;
   wherein at least one duration limitation relating to an entire duration of the magnetic resonance sequence or a specified time constant is provided and the temporal sequence pattern is expanded beyond the subsection by the simulation unit by repetition of the subsection, until the entire duration or the specified time constant is reached or an abort criterion relating to the at least one duration limitation is satisfied.

2. The method of claim 1, wherein at least one limitation of the provided limitations relates to a current state, wherein the at least one limitation is evaluated on a basis of an individual pass of the simulation of the subsection.

3. The method of claim 1, wherein at least one interim result of a previous simulation pass is reused for the repetition of the simulation passes of the subsection.

4. The method of claim 1, wherein the repetition of the simulation of the subsection is restricted to a component or group of components relevant in respect of the duration limitation.

5. The method of claim 1, wherein for the abort criterion, a check is made to see whether a calculation value that may be derived from the temporal sequence pattern exceeds or undershoots a threshold value defined by the duration limitation.

6. The method of claim 5, wherein for a further abort criterion a check is made to see whether a pattern of the calculation value indicates an expected failure to reach the threshold value over the entire duration or the specified time constant.

7. The method of claim 1, wherein the duration limitation relates to at least one of an average value, an account value, or in respect of energy to be consumed by a gradient system of the magnetic resonance device.

8. The method of claim 1, further comprising:
   applying a correction taking account of a selection of the subsection for an evaluation of the temporal sequence pattern.

9. The method of claim 1, wherein a section of the magnetic resonance sequence, in which outer k-space points are encoded, is used as the subsection.

10. The method of claim 1, wherein in that the subsection covers a period of less than 10 ms, and/or the specified time constant is at least 10 ms.

11. A magnetic resonance device comprising:
   a control device comprising:
      at least one processor and at least one storage device, the at least one processor and at least one storage device configured to implement:
         a limitation provision unit configured for a provision of at least one limitation, wherein the at least one limitation comprises at least one duration limitation relating to an entire duration of a magnetic resonance sequence or a specified time constant;
         a sequence parameter provision unit configured for a provision of multiple sequence parameters of the magnetic resonance sequence;
         a selection unit configured for a selection of at least one of the multiple sequence parameters;
         a simulation unit configured for a determination of a temporal sequence pattern over time by simulation of a subsection of the magnetic resonance sequence on a basis of at least one selected sequence parameter of the multiple sequence parameters and for an expansion of the temporal sequence pattern beyond the subsection by repetition of the subsection, until the entire duration or the specified time constant is reached or an abort criterion relating to the duration limitation is satisfied;
         an evaluation unit configured for a determination of a permissible parameter value range for at least one selected one of the sequence parameters on a basis of the temporal sequence pattern and the at least one limitation;

a definition unit configured for a definition of a parameter value of the at least one selected sequence parameter within the permissible parameter value range; and a sequence unit configured for an acquisition of magnetic resonance data by the magnetic resonance sequence with the defined parameter value.

12. The magnetic resonance device of claim 11, wherein at least one limitation relating to a current state is evaluated on a basis of an individual pass of the simulation of the subsection.

13. The magnetic resonance device of claim 11, wherein at least one interim result of a previous simulation pass is reused for the repetition of the simulation passes of the subsection.

14. The magnetic resonance device of claim 11, wherein the repetition of the simulation of the subsection is restricted to a component or group of components relevant in respect of the duration limitation.

15. The magnetic resonance device of claim 11, wherein for the abort criterion, a check is made to see whether a calculation value that may be derived from the temporal sequence pattern exceeds or undershoots a threshold value defined by the duration limitation.

16. The magnetic resonance device of claim 15, wherein for a further abort criterion a check is made to see whether a pattern of the calculation value indicates an expected failure to reach the threshold value over the entire duration or the specified time constant.

17. The magnetic resonance device of claim 11, wherein the duration limitation relates to at least one of an average value, an account value, or in respect of energy to be consumed by a gradient system of the magnetic resonance device.

18. A non-transitory computer implemented storage medium that stores machine-readable instructions executable by at least one processor for creating a magnetic resonance sequence for a magnetic resonance device, the machine-readable instructions comprising:

determining a temporal sequence pattern over time using provided parameter values of sequence parameters and a simulation of a subsection of the magnetic resonance sequence by a simulation unit, wherein the magnetic resonance sequence is described by at least one sequence parameter of the sequence parameters;

determining, by an evaluation unit based on the temporal sequence pattern and provided limitations, a permissible parameter value range for at least one selected sequence parameter of the sequence parameters; and defining, by a definition unit, a new parameter value of the at least one selected parameter within the permissible parameter value range;

wherein at least one duration limitation relating to an entire duration of the magnetic resonance sequence or a specified time constant is provided and the temporal sequence pattern is expanded beyond the subsection by the simulation unit by repetition of the subsection, until the entire duration or the specified time constant is reached or an abort criterion relating to the at least one duration limitation is satisfied.

* * * * *